United States Patent [19]

Bristol et al.

[11] Patent Number: 5,507,882
[45] Date of Patent: Apr. 16, 1996

[54] LOW RESIDUE WATER-BASED SOLDERING FLUX AND PROCESS FOR SOLDERING WITH SAME

[75] Inventors: Samuel V. Bristol, Kokomo; Eugene H. Hanaway, Rochester; Delbert R. Walls, Kokomo, all of Ind.

[73] Assignee: Delco Electronics Corporation, Kokomo, Ind.

[21] Appl. No.: 203,176

[22] Filed: Feb. 28, 1994

[51] Int. Cl.⁶ ................................................ B23K 35/34
[52] U.S. Cl. ................................ 148/23; 148/24; 228/223
[58] Field of Search ......................... 148/23–25; 228/223

[56] References Cited

U.S. PATENT DOCUMENTS

| | | | |
|---|---|---|---|
| 2,715,084 | 8/1955 | Konig | 148/23 |
| 2,898,255 | 8/1959 | Thompson et al. | 148/23 |
| 2,904,459 | 9/1959 | Kobota | 148/23 |
| 3,235,414 | 2/1966 | Marks | 148/23 |
| 3,264,146 | 8/1966 | Marks | 148/23 |
| 3,837,932 | 9/1974 | Aronberg | 148/23 |
| 4,168,996 | 9/1979 | Zado | 248/23 |
| 5,004,504 | 4/1991 | Bristol | 148/23 |
| 5,092,943 | 3/1992 | Davis | 148/25 |
| 5,145,722 | 9/1992 | Kaspaul | 148/25 |
| 5,281,181 | 1/1994 | Stefanowski | 148/23 |
| 5,297,721 | 3/1994 | Schneider et al. | 228/180.1 |

FOREIGN PATENT DOCUMENTS

| | | | |
|---|---|---|---|
| 0324194A | 1/1988 | European Pat. Off. | B23K 35/36 |
| 1017460A | 1/1982 | U.S.S.R. | B23K 35/36 |
| 801510 | 1/1955 | United Kingdom . | |
| 2181084 | 9/1986 | United Kingdom . | |

OTHER PUBLICATIONS

"Europeans find ways to phase-out CFCs," *Electronic Packaging & Production,* vol. 29, No. 1, Jan. 1989, pp. 26 and 28.

*Primary Examiner*—Peter D. Rosenberg
*Attorney, Agent, or Firm*—Mark A. Navarre

[57] ABSTRACT

Low residue water-based soldering flux, and process and system for using the same. The flux includes a mixture of succinic, glutaric and adipic acid in water, and optionally a wetting agent. The flux is applied to a surface to be soldered. The flux is dried. The surface is soldered. The flux is applied at an application station, dried at a drying station and soldered at a soldering station.

12 Claims, 1 Drawing Sheet

LOW RESIDUE WATER-BASED SOLDERING FLUX AND PROCESS FOR SOLDERING WITH SAME

BACKGROUND OF THE INVENTION

1. Field of the Invention

This invention relates to a low residue soldering flux and to a method of using it. More particularly, it relates to a water-based flux that contains a very special mixture of three dibasic acids that not only provides effective fluxing action at low temperatures but also provides a resultant soldered product that is substantially ionic residue-free.

2. Technical Field

A soldering flux is used to aid fusion of the parts being joined by reacting with and dissolving their surface oxides or impurities while coating the surfaces against oxidation, during soldering, at a temperature above the solder melting point.

Organic fluxes are typically based on water-insoluble rosin or water-soluble organic acid. Activated rosin fluxes are used in soldering electrical connections on printed circuit boards. Wave soldering is used for mass production circuit board soldering as by applying the flux, preheating the board, applying the solder (e.g., via a molten solder standing wave), cooling the board, and cleaning it to remove flux residue.

Such flux residue is mainly constituted of ionic (e.g., acidic or basic) substances, and is corrosive, or can hydrolyze to corrosive constituents in the presence of moisture (e.g., air moisture). This can lead to short circuits, noise generation, etc., in use of the circuit board product. These adverse results are effectively avoided by subjecting the soldered board to a cleaning step to remove the ionic substances.

U.S. Pat. No. 5,004,509 discloses a low residue soldering flux that has overcome many of the disadvantages faced by prior art fluxes. The flux of that patent contains a Three-acid mixture of succinic, glutaric and adipic acids. The Three-acid mixture is sometimes referred to herein as TAM. The TAM of U.S. Pat. No. 5,004,509 is employed either with or without a rosin component, and is dissolved in a suitable organic solvent, namely a volatilizable organic solvent. U.S. Pat. No. 5,004,509 discloses that water can only be used in minor amounts in a flux having both rosin and the Three-acid mixture. Further, in the rosin free flux of U.S. Pat. No. 5,004,509, water may be employed but only in a slight amount, i.e., at most about 1% of the total vehicle. The use of only minor amounts of water in the flux is specifically emphasized at Col. 7, lines 37–40 of U.S. Pat. No. 5,004,509, in order "to inhibit splattering and deposition of residue at the soldering site, and possibly solder ball formation, that adversely affect product quality." Moreover, where water is employed in a flux of U.S. Pat. No. 5,004,509, which contains an aliphatic carboxylic acid ester (as a wetting agent), the flux also desirably includes an hydrolysis inhibiting agent to control the extent of hydrolysis of the ester that occurs in the presence of water. This was another reason expressed for keeping water content in the flux low.

A number of background patents are discussed in U.S. Pat. No. 5,004,509, including U.S. Pat. Nos. 2,715,084, 2,898,255, 2,904,459, 3,235,414, 3,264,146, 3,837,932 and 4,168,996. Another composition is disclosed in SU 1017460.

The importance of a residue-free soldered connection is discussed in the article entitled: "Europeans find ways to phase-out CFCs," *Electronic Packaging & Production*, Vol. 29, No. 1, January 1989, pp. 26 and 28, Linda Smith-Vargo, Associate Editor. The article notes that fluxes used in printed circuit board applications leave residues that must be cleaned, typically by an organic liquid based on fully halogenated chlorofluorocarbons or CFCs, but that in view of the need to reduce CFC emissions, due to environmental constraints, soldering procedures are needed that avoid CFCs yet produce a residue-free non-corrosive product.

It is desirable to have a flux for soldering metal connections in electrical applications such as printed circuit boards that does not produce a corrosion-causing and/or hydrolyzable ionic residue that requires a cleaning step for its removal.

SUMMARY OF THE INVENTION

This invention is an improvement over the subject matter of U.S. Pat. No. 5,004,509. It has been discovered that the Three-acid mixture of U.S. Pat. No. 5,004,509 can be employed in a water-based flux, in which water is present as a major ingredient. In a preferred embodiment, a flux including about 1.5 to about 4.0% of a Three-acid mixture of succinic, glutaric, and adipic acids in Deionized water is contacted with a surface. The flux is dried, preferably by heating. Solder is then applied to the surface. In another embodiment the flux further includes about 0.002 to about 0.02% of a wetting agent. Surprisingly beneficial soldering properties are achievable without the occurrence of splattering, residue deposition at the soldering site, or solder ball formation. The flux has excellent wetting characteristics without the need to employ an inhibitor of hydrolysis.

All percentages (%), parts (pts) or proportions set forth in this application are by weight unless specifically indicated otherwise.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

DETAILED DESCRIPTION OF THE PREFERRED EMBODIMENT

Figure 1:
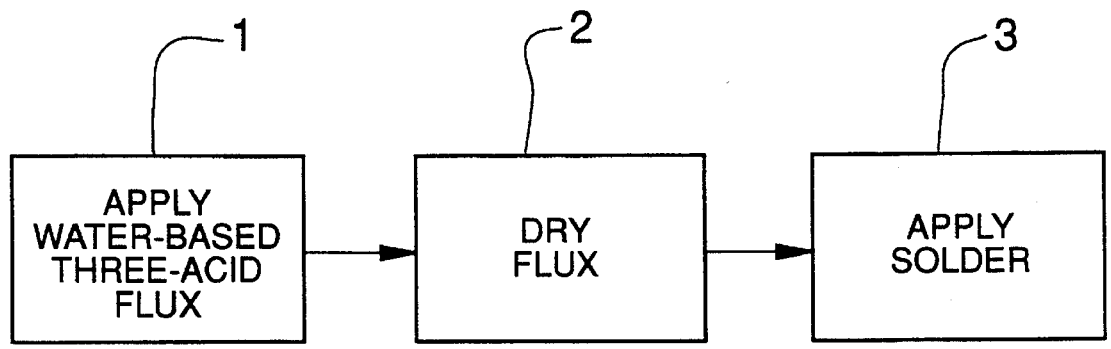
FIG. 1 is a flow chart depicting the steps of the process of the present invention.

As used herein, "water-based" shall mean an amount of water, of at least about 96%. The present invention is predicated upon the discovery that advantageous soldering characteristics are achievable in a soldering process using a water-based soldering flux that includes an admixture of dibasic acids and water. In a particularly preferred aspect, the soldering flux consists essentially of a Three-acid mixture ("TAM") as described herein, a wetting agent, and Deionized water. The present invention is also predicated upon the discovery of a process for soldering that includes applying the aforenoted soldering flux to a surface, drying the soldering flux (preferably by heating it) to remove water, and applying solder to the surface.

Typically, the soldering flux of the present invention includes about 1.5% to about 2.0% of the Three-acid mixture, 0.002% to about 0.004% of the wetting agent, with the balance being Deionized water. The Three-acid mixture (TAM) is an essentially non-subliming dibasic acid mixture of succinic, glutaric and adipic acids. It especially contains about 15–30% succinic acid, 40–63% glutaric acid and 10–30% adipic acid and, more particularly, about 18–30% succinic acid, 51–61% glutaric acid and 11–30% adipic acid. The percentages of succinic, glutaric and adipic acid are based on the total dibasic acid mixture.

The Three-acid mixture desirably has a melting point (mp) of about 90°–130° C. and a boiling point (bp) of about 150°–210° C., especially 170°–195° C., and is capable of essentially completely volatilizing during heat soldering to leave the site essentially free from ionic residue. In particular, it is capable of leaving at most a trace amount of residue of corrosive, or hydrolyzable potentially corrosive, ionic (e.g., acidic) constituents.

As used herein, essentially "non-subliming" means that the constituents of the Three-acid mixture in the flux that volatilize during the heat soldering operation, remain volatilized and do not recondense and/or redeposit at the soldering site as ionic residue. Thus, the Three-acid mixture is an essentially non-recondensing and non-redepositing volatilizable dibasic acid mixture, according to the invention.

The Three-acid mixture is desirably present in the water-based flux of the present invention in a sufficiently dilute concentration so that it is capable of essentially completely volatilizing during heat soldering to leave the soldering site essentially free from ionic residue.

Generally, if the amount of the Three-acid mixture in the water-based flux is below about 0.5% of the total flux, the fluxing action is insufficient for the heat soldering operation. This is true for operations where the flux is applied as only one coating. I do not know if multiple coatings of more dilute solutions, with intervening drying, can be used to provide an equivalent quantity of the Three-acid mixture on a given surface. By total flux, I mean all the components of the flux including the water vehicle. On the other hand, if the Three-acid mixture amount is above about 1.5%, more particularly, above about 2.0%, especially above about 4.0%, and generally above about 5.0%, and for sure above about 10%, of the total flux, the tendency for the ionic residue of the rosin-free flux, to exceed an acceptably low level after soldering, is progressively increased.

On the other hand, it should be recognized that in this invention, the level of ionic residue after soldering is also dependent on the soldering temperature. For most circuit board applications using a soldering temperature of about 250–260 degrees centigrade, a TAM of greater than about 4% would generally provide too high of an ionic residue level. However, for other applications, where either a higher soldering temperature is used, or where a higher ionic residue level is acceptable, TAM proportions greater than 4% can be used. Also, an acceptably low ionic residue level is one that avoids the need for a washing step after soldering, as well as one which is attainable without the trouble and expense of supplemental heating of the soldering site to raise the ambient temperature sufficiently above the soldering temperature for artificially or extraneously insuring the essentially complete boiling off of the flux constituents.

Therefore, it is recommended for practical, efficient soldering, when using the TAM-based flux in circuit board soldering applications where soldering temperatures are about 250–260 degrees centigrade, to provide the TAM in an amount preferably below about 10%, more preferably, below about 5%, and especially not greater than about 4%, of the total flux. This will leave an essentially ionic residue-free soldering site consequent the normally conducted heat soldering operation, without splattering, subliming or local deposition of the flux constituents.

In the case of other soldering applications, where stronger fluxing action and/or a higher soldering temperature is used, as for example a soldering temperature of about 300–350 degrees centigrade the TAM proportion may exceed about 3%, or about 3.5%, or even about 4%, of the total flux. In these circumstances, the amount of the Three-acid mixture may even be increased up to about 5%, and still a low ionic residue will result. However, at these soldering temperatures the TAM will generally be less than about 10% of the total flux if one wants a low ionic residue. On the other hand, it should be recognized that at soldering temperatures higher than 350 degrees centigrade, as for example up to 450 degrees centigrade, even higher proportions of the TAM can be used while still obtaining low ionic residue. Consequently, the actual amount of the Three-acid mixture in the total rosin-free flux will be selected in dependence upon the nature of the metals being soldered, the degree of fluxing action required, and the soldering temperature. The proportions of the three acids to each other in the Three-acid mixture (TAM), and of all components in the flux, are selected to provide surface tension properties and a boiling point that enhance flux spreading and "wetting" of the surfaces being soldered and volatilization with innocuous decomposition without splattering, subliming or local redeposition.

U.S. Pat. No. 5,004,509 (hereby expressly incorporated by reference) describes the preferred Three-acid mixture. As noted in that patent, the treatise, Kirk-Othmer Encyclopedia of Chemical Technology, 3rd ed., John Wiley & Sons, provides a review of "Dicarboxylic Acids" (vol. 7: 614–625), i.e., the saturated, linear aliphatic series of dicarboxylic acids (diacids), from which melting and boiling point data as to the first nine of these organic dibasic acids are compiled in Table A.

TABLE A

| | | Melting and Boiling Points | | |
|---|---|---|---|---|
| Total carbon atoms | UIPAC name | Common name | mp °C. | bp °C. |
| 2 | ethane-dioic | oxalic | 187 (dec) | |
| 3 | propane-dioic | malonic | 134–136 (dec) | |
| 4 | butane-dioic | succinic | 187.6–187.9 | |
| 5 | pentane-dioic | glutaric | 98–99 | $200_{2.7}$ kPa |
| 6 | hexane-dioic | adipic | 153.0–153.1 | $265_{13.3}$ kPa |
| 7 | heptane-dioic | pimelic | 105.7–105.8 | $272_{13.3}$ kPa |
| 8 | octane-dioic | suberic | 143.0–143.3 | $279_{13.3}$ kPa |
| 9 | nonane-dioic | azelaic | 107–108 | $286.5_{13.3}$ kPa |
| 10 | decane-dioic | sebacic | 134.0–134.4 | $294.5_{13.3}$ kPa |

*To convert kPa to mm Hg, multiply by 7.5: 2.7 kPa × 7.5 = 20 mm Hg; 13.3 kPa × 7.5 = 100 mm Hg.

Further, as noted in U.S. Pat. No. 5,004,509, from that same treatise, data as to the ionization constants of these diacids are also compiled in Table B.

TABLE B

| Diacid | Ionization Constants in Water | | |
|---|---|---|---|
| | Temp., °C. | K1 | K2 |
| oxalic | 25 | $5.36 \times 10^{-2}$ | $5.42 \times 10^{-5}$ |
| malonic | 25 | $1.42 \times 10^{-3}$ | $2.01 \times 10^{-6}$ |
| succinic | 25 | $6.21 \times 10^{-5}$ | $2.31 \times 10^{-6}$ |
| glutaric | 25 | $4.58 \times 10^{-5}$ | $3.89 \times 10^{-6}$ |
| adipic | 25 | $3.85 \times 10^{-5}$ | $3.89 \times 10^{-6}$ |
| pimelic | 18 | $3.19 \times 10^{-5}$ | $3.74 \times 10^{-6}$ |
| suberic | 18 | $3.05 \times 10^{-5}$ | $3.85 \times 10^{-6}$ |
| azelaic | 18 | $2.88 \times 10^{-5}$ | $3.86 \times 10^{-6}$ |
| sebacic | 25 | $3.1 \times 10^{-5}$ | $3.6 \times 10^{-6}$ |

As noted in the previously mentioned U.S. Pat. No. 5,004, 509, selected characteristics based on Tables A and B, and the molecular weights of these diacids are given in Table C.

TABLE C

| Acid | Formula | Selected Characteristics | | | |
|---|---|---|---|---|---|
| | | M. Wt. | mp °C. | bp °C. | K1 |
| oxalic | HOOC—COOH | 90 | 187d | | $5.36 \times 10^{-2}$ |
| malonic | HOOC $CH_2$COOH | 104 | 135d | | $1.42 \times 10^{-3}$ |
| succinic | HOOC($CH_2$)$_2$COOH | 118 | 188 | 200* | $6.21 \times 10^{-5}$ |
| glutaric | HOOC($CH_2$)$_3$COOH | 132 | 98.5 | 265** | $4.58 \times 10^{-5}$ |
| adipic | HOOC($CH_2$)$_4$COOH | 146 | 153 | 272** | $3.85 \times 10^{-5}$ |
| pimelic | HOOC($CH_2$)$_5$COOH | 160 | 106 | 279** | $3.19 \times 10^{-5}$ |
| suberic | HOOC($CH_2$)$_6$COOH | 174 | 143 | 286.5** | $3.05 \times 10^{-5}$ |
| azelaic | HOOC($CH_2$)$_7$COOH | 188 | 107.5 | 294.5** | $2.88 \times 10^{-5}$ |
| sebacic | HOOC($CH_2$)$_8$COOH | 202 | 134 | | $3.10 \times 10^{-5}$ |

*20 mm Hg
**100 mm Hg

U.S. Pat. No. 5,004,509 indicates that treatise points out that these diacids are crystalline solids, whose melting points decrease as the aliphatic chain length (m. wt.) increases, with alternation of some physical properties of neighboring members of the series such as oscillating melting point, water solubility and ease of decarboxylation or decomposition, but not of others such as boiling point, density and dielectric constant. Whereas the odd-numbered acids melt lower than their neighbors, e.g., the 5 carbon atom glutaric acid melting much lower than the neighboring 4 carbon atom succinic acid and 6 carbon atom adipic acid, their boiling points increase with increasing molecular weight.

The boiling points of the lower (m. wt.) diacids are difficult to measure as they sublime, dehydrate or decompose, the even-numbered carbon atom acids being more resistant to decarboxylation or decomposition than the odd-numbered acids preceding them. Their thermal decomposition is sensitive to catalytic effects of impurities, environment and the decomposition products themselves, and results in decarboxylation to a monocarboxylic acid or anhydride formation, with water elimination, succinic and glutaric acids forming cyclic anhydrides and adipic acid forming a cyclic ketone.

Malonic and glutaric acids are extremely water soluble, the remaining even-numbered acids being only moderately soluble, solubility alternating between higher values for the odd-numbered acids and lower values for their even-numbered neighbors, yet rapidly decreasing with increasing chain length (m. wt.). Oxalic and malonic acids are strong acids and the higher homologues (m. wt.) are progressively weaker. While the odd-numbered acids have lower ionization constants than their even-numbered neighbors, the ionization constant values become almost constant for all the acids above adipic acid.

Elsewhere, that treatise notes that malonic acid loses carbon dioxide on heating above its melting point, and in aqueous solution, undergoes decarboxylation at 70° C. (vol. 14: 794–795); that succinic acid sublimes when heated below its 188° C. melting point, dehydrates at its melting point, and forms a cyclic anhydride, succinic anhydride having mp 119.6° C. (vol. 21: 848–849); and that adipic acid, unlike glutaric acid and succinic acid, does not readily form a cyclic anhydride, but decomposes to cyclopentanone above 225° C. (vol. 1: 510–513).

As U.S. Pat. No. 5,004,509 notes, the Merck Index, 10th ed. 1983, Merck & Co., Rahway, N.J., shows similar data as to these nine diacids, especially their boiling points at normal pressure (760 mm Hg). It indicates that oxalic acid sublimes at 157° C., decomposes at higher temperature, and is hygroscopic and poisonous; that malonic acid melts with decomposition at about 135° C.; that succinic acid has mp 185°–187° C. and bp 235° C. with partial conversion to the anhydride (of mp 119.6° C. and bp 261° C.); that glutaric acid has mp 97.5°–98° C. and bp 302°–304° C. with very slight decomposition; that adipic acid has mp 152° C. and bp 337.5° C. and is not hygroscopic; and that pimelic acid tends to sublime.

Oxalic and malonic acids are undesirable for this invention because of their low molecular weights, strong acidity and high dissociation constants, and the fact that oxalic acid sublimes at 157° C. and is hygroscopic while malonic acid decomposes at its 135° C. melting point, thereby adversely affecting the flux characteristics and causing large ionic residues, e.g., from decomposition and sublimation products.

Pimelic and higher acids are undesirable for this invention because of their cost, and high molecular weights and boiling points (which increase with their increasing molecular weights) that may adversely affect the characteristics and adequacy of boiling off of the flux. Pimelic acid is not only costly, but also may splatter and sublime to expose the circuit board to local deposition of sublimation or decomposition constituents detracting from product quality.

U.S. Pat. No. 5,004,509 notes that, while succinic acid also tends to sublime, the glutaric acid is quite water soluble, compared to non-hygroscopic adipic acid, on using these three acids as a mixture in the above-stated proportions, the average molecular weight and depressing boiling point of the mixture, as opposed to the individual acids, seem to impart efficient spreading action to the flux, and the higher content lower boiling glutaric acid seems to aid boiling off of the lower content higher boiling succinic and adipic acids, as it has been found that the flux spreads without voids, does not splatter and leaves a low residue.

The Three-acid mixture or TAM used for the flux of the invention may also be from any source, such as a commercial mixture of succinic, glutaric and adipic acids in which the three acids are in the desired proportions.

A first commercial mixture is a blend of the three acids available from DuPont Canada, Inc. (DuPont Canada), of good solubility, mild acidity (pH 2.95 of 0.1N aqueous solution), melting range 90°–130° C. and boiling range 170°–195° C., which has:

TAM Formulation #1—assay 97.0% (min.), 26–30% succinic acid, 55–59% glutaric acid and 11–15% adipic acid, plus 3% acid anhydrides (average), 0.8% succinimide (max.), 0.6% glutarimide (max.), 0.3% water (max.) 1 ppm copper (max.), 1 ppm vanadium (max.), and 5 ppm iron (max.). Typically, it has assay 97.6%, 27.7% succinic acid, 56.6% glutaric acid and 13.2% adipic acid, plus 2.7% acid anhydrides, 0.7% succinimide, 0.56% glutarimide, 0.08% water, 0.28 ppm copper, 0.1 ppm vanadium and 1.9 ppm iron; or it has about 27% succinic acid, 57.5% glutaric acid and 11.6% adipic acid, plus about 4% acid anhydrides, 0.7% succinimide, 0.5% glutarimide and 0.2% water.

A second commercial mixture is the product, designated "DBA", available from DuPont Co., Wilmington, Del. (DuPont), of 20% water solubility (18° C./64° F.), which has:

TAM Formulation #2—18–28% succinic acid, 51–61% glutaric acid and 15–25% adipic acid, plus 1% organic nitrogen compounds, 0.2% nitric acid, 0.02% copper and 0.01% vanadium, and is available in a 50% concentration solution of the three acids in Deionized water, sp.g. 1.106, having 26% succinic acid, 55% glutaric acid and 18% adipic acid, plus 0.3% nitric acid.

A third commercial mixture is a dicarboxylic acid product available from BASF Corp., Parsippany, N.J., of about 10% water solubility (room temp.), and about 100°–130° C. melting range and 150°–210° C. boiling range, which has:

TAM Formulation #3—assay 97% (min.), 25–30% succinic acid, 42–47% glutaric acid and 25–30% adipic acid, plus 2.3% 2,5-pyrrolidinedione and 2,6-piperidinedione, and 0.5% water.

A fourth commercial mixture is the product, designated "Diacides AGS", available from Rhone-Poulenc Inc., Princeton, N.J., of about 10% water solubility (room temp.) and 100°–130° C. melting range, which has:

TAM Formulation #4—18–25% succinic acid, 50–55% glutaric acid and 20–25% adipic acid, plus 1.4% succinic anhydride, and particularly 19.5% succinic acid, 51.6% glutaric acid and 22.6% adipic acid, plus 1.4% acid anhydrides (as succinic anhydride), 0.06% nitrogen (Kjeldahl), 0.3% water, 0.4 ppm copper, 0.06 ppm vanadium and 2.4 ppm iron.

These TAM formulations are especially usable as the Three-acid mixture, with the components in the range of about 18–30% succinic acid, 51–61% glutaric acid and 11–30% adipic acid.

It was quite unexpected that these Three-acid mixtures, per TAM formulations #1–4, which are not especially purified, perform satisfactorily in the flux to provide consistent solderability under the relatively rigid conditions extant in electronic circuit board component soldering, yet leave the site essentially free from ionic residue and avoid a washing step, despite the impurities in such commercial grade mixtures.

This is especially so in view of the above indication in the Kirk-Othmer treatise that thermal decomposition of these diacids is sensitive to catalytic effects of impurities, and potentially those listed in commercial TAM formulations #1–4.

The costs of chemicals in pure and commercial grade form are influenced by many factors, yet provide useful comparisons. U.S. Pat. No. 5,004,509, noted costs of the three pertinent acids in pure form, and the next higher acid, pimelic, which are compared in Table D.

TABLE D

Comparative Costs of Individual Acids

| Acid | Unit Cost | Calculated Cost | Per Kg |
|---|---|---|---|
| Succinic | $126.90/2.5 kg | $50.76 | $50.76 |
| Glutaric | 14.20/25 g | 568.00 | — |
| Adipic | 24.60/2 kg | 12.60 | 12.60 |
| Pimelic | 61.25/100 g | — | 612.50 |
| Total | | $631.36 | $675.86 |
| Average | | $210.45 | $225.28 |

Arbitrarily taking equal amounts of the three acids as a mixture, comes to an average cost of $210.45/kg, and substituting pimelic for glutaric acid increases it to $225.28/kg, and even higher if it is substituted for succinic or adipic acid. Any such substitution would change the properties of the resulting mixture, given the differences in melting and boiling points among these acids and the increase in average molecular weight imparted by the heavier pimelic acid component, aside from the objectionable tendency of pimelic acid to sublime.

Pat. No. 5,004,509 notes that the cost of the commercial purity mixtures of succinic, glutaric and adipic acids, per TAM formulations #1–4 above, is roughly $1.25/kg ($0.57/lb), which is far less than the above calculated average cost of a mixture of the pure acids, and a comparable mixture in which pimelic acid is substituted for glutaric acid would be even more expensive. Despite the lower purity of these commercial mixtures in the flux and the need to limit the ionic residue to, at most, a trace amount, they surprisingly perform eminently satisfactorily for the purposes of the invention, without having to formulate the mixture from the high purity individual acids at high cost.

Based on the above Merck Index data, as referenced in U.S. Pat. No. 5,004,509, their melting points and boiling points may be taken generally as set forth in Table E.

TABLE E

Approximate Melting and Boiling Points

| Acid | mp°C. | bp°C. |
|---|---|---|
| Succinic | 186 | 235 |
| Glutaric | 98 | 303 |
| Adipic | 152 | 337.5 |
| Total | 436 | 875.5 |
| Average | 145° C. | 292° C. |

The commercial mixtures of these acids have 90–130 and 100°–130° C. mp ranges, and 170–195 and 150°–210° C. bp ranges, of average mp 110° C. and bp 180° C. well below the Table E averages. The commercial mixture mp range is below the melting points of succinic and adipic acid, and its bp range is below the boiling point of succinic acid, i.e., the lowest of the three acids.

A distinct benefit of the commercial mixture depressed boiling range is that the acids boil away to leave a low ionic residue, so that the impurities in the commercial grade mixtures and high acidity of their dibasic acid content have been found not to be a problem. When the three acids are in the above-noted ranges, optimum results are achievable for adequately coating the surfaces to be soldered, while inhibiting splattering, sublimation and local redeposition.

Despite the high acid content and impurities in the commercial mixtures, the constituents boil off at ambient soldering conditions, avoiding a large ionic residue and a washing step for its removal, and the low ionic residue that is left occurs without supplemental heating as normally used to prevent local redeposition of constituents. The flux assures more consistent solderability in attaining a low ionic residue product, and soldering occurs without causing annoying or noxious odors on the circuit boards or fixtures, and provides a circuit board product whose surfaces have a desired post-solder dryness and non-tack condition without use of additional cleaning steps.

The inclusion of the wetting agent in the soldering flux of the present invention imparts a lower surface tension to the flux than a flux without the wetting agent. This aids the flux in spreadability over a surface to be soldered, thereby improving the soldering operation. In the meantime, it results in a flux that leaves only a trace amount of ionic residue.

The wetting agent employed in the soldering flux of the present invention is characterized as a wetting agent that also has antistatic properties. From a general standpoint, enough of this agent is used to obtain adequate wetting of the circuit board by the flux but not so much as to cause excessive foaming of the flux.

Examples of preferred commercially available wetting agents include those available under the trademark Cyastat®, which is manufactured by the American Cyanamid Company, P.O. Box 6885, Bridgewater N.J. 08807-6885. Specific examples include, without limitation, Cyastat®609, Cyastat® SP, Cyastat®SN, and Cyastat®LS. Cyastat®609 Antistatic Agent is also called N,N-bis(2-hydroxyethyl)-N-(3'-dodecyloxy-2'-hydroxypropyl) methylammonium methosulfate. Cyastat®SP Antistatic Agent is also called Stearamidopropyldimethyl-Beta-Hydroxyethylammonium dihydrogen phosphate. Cyastat®SN Antistatic Agent is also called Stearamidopropyldimethyl-Beta-Hydroxyethylammonium nitrate. Cyastat®LS Antistatic Agent is also called (3-Lauramidopropyl) trimethylammonium methylsulfate. Of course, other commercially available wetting agents may be advantageously employed in the soldering flux of the present invention, preferably if they are also antistatic agents too.

The amount of such wetting agent that is employed in the soldering flux is enough to result in achieving the desired surface tension characteristics for spreadability of the flux composition, while not resulting in excessive foaming and/ or in substantially increased ionic residue after soldering.

These advantageous characteristics are attained when the wetting agent is employed in an amount preferably below about 0.02%, more preferably below about 0.01% and still most preferably about 0.003–0.004% of the total flux composition.

This being a water-based composition, water preferably is employed in an amount greater than about 50 wt. %, more preferably greater than about 90%, still more preferably greater than about 95 wt. % and even still more preferably about 96 wt. % to about 99 wt. %. Lower amounts of water are likewise contemplated, such as for concentrates. The water preferably is Deionized to aid in achieving an essentially ionic residue-free condition.

In heat soldering metal surfaces, solder is applied to the surfaces in the presence of an effective amount of the flux in coating disposition on the surfaces, and at a temperature sufficient for molten flow of the solder. The flux is dried, preferably by heating it to drive off water. The coated surfaces may also be heated at a temperature sufficient for volatilizing the flux to leave the site essentially ionic residue-free. The soldering may be at conventional temperature, e.g., about 250°–260° C., but could be up to 350° C., and even up to about 450° C. for other soldering applications. For example, circuit board components may be soldered at the lower end of the temperature range and other connections at the higher end of the range.

The solder may be of any known type such as tin-lead solder, e.g., 60% Sn—40% Pb of mp 191°–193° C. or eutectic tin-lead solder, e.g., 63% Sn—37% Pb of mp 183° C.

Figure 2:
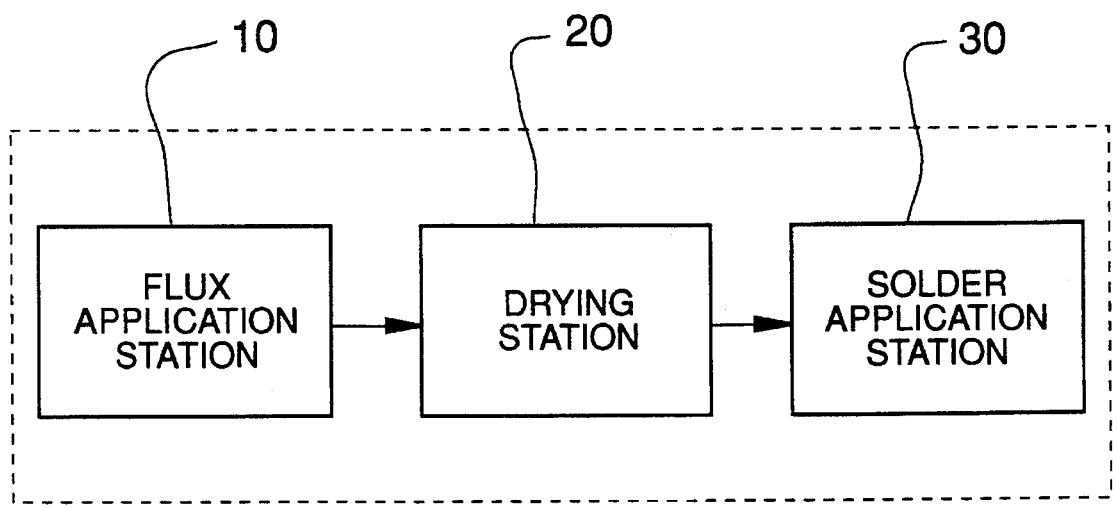
FIG. 2 is a schematic diagram of a system employed in the practice of the process of the present invention.

This flux can be used in commercial type soldering machines, especially of the "wave" type, which are currently widely used. Such a machine is generally represented by FIG. 2. For example this flux was used for soldering circuit boards in an Electrovert Ultra Pak with Wavedynamics. This machine is of the contour wave type and the conveyor speed was set at 6.0 feet per minute. It was retrofitted with a Spray Fluxer manufactured by EFD Inc., East Providence, R.I., with a type 780S spray valve. This machine provides a nitrogen atmosphere and can be used for soldering at temperatures of 250°–300° C. It has two bottom-side circuit board preheaters. For soldering at temperatures of about 250°–260° C., the first preheater is set at about 480°–485° C. and the second set at about 502°–515° C.

The preheaters are used to heat the board immediately before soldering. While the heat zone of each preheater is rather hot, the board is only exposed to preheating for less than a minute. Hence, the board is not heated to the temperature of the heat zone. The actual temperature desired for the preheat fields will vary, depending on the length of the heat field, the speed at which the circuit board moves through it, and the soldering temperature used.

As indicated by step 1 of FIG. 1, the water-based Three-acid flux of the present invention is placed in contact with the surface of the article to be soldered (e.g., a circuit board) before solder is applied. The flux is applied in any convenient manner while the article is at a suitable flux application station (as designated by reference numeral 10 in FIG. 2).

The flux may be applied to the surface to be soldered by any conventional technique, e.g., foaming, wave fluxing, spraying, brushing, rolling, dipping, etc. at the flux application station. For circuit boards, the flux is usually applied only to the side of the board being soldered. Fluxes for wave soldering are usually applied at room temperature, or only slightly above room temperature. However, since the flux of this invention is non-flammable, it may be heated at about 40°–50° C., or higher. Such heating can be used to drive off most of the water from the fluxed surface of the board before that surface is preheated for solder application. Drying temperatures higher than 50° C. can be used. However, if the heating is prolonged, it is preferred to use as low a drying temperature as is practical. On general principles, it is usually not desirable to expose semiconductor components to unnecessarily high temperatures for long periods. The spray fluxer in the soldering machine described above did not have a capability of heating the flux to a temperature higher than 38° C. Accordingly, the flux, which was heated at about 40°–50° C., was manually sprayed on, resulting in complete water evaporation before the circuit boards contact the hot solder in the soldering machine. Hand spraying of the flux onto the bottom side of the circuit boards, with the flux at this temperature range, allows the flux to almost dry in room temperature air in less than a minute. Similarly, a flux containing 2% TAM in water was applied with a spray fluxer which was not heated, and provided satisfactory results for a whole day of production in the above described machine. In the particular experiment with a mist type of spray fluxer, the two machine preheaters (before the solder station) seemed to provide an adequate drying effect. As indicated above, and in accordance with step 2 of FIG. 1, the flux on the article to be soldered is dried prior to it reaching a solder wave. This prevents the solder from splattering when the circuit board is exposed to the hot solder. A drying station is denoted by reference numeral 20 in the apparatus of FIG. 2. For wave-soldering an article such as a printed circuit board, one or more high temperature preheaters may be employed. Care must be taken to be sure that boards coated with this flux are fairly dry before being exposed to the high temperature preheaters for the soldering station.

Application of this flux by spraying a fine mist is the preferred method, as compared to applying it by waving or foaming. A manual spray mist applicator and an EFD machine spray fluxer were used to do this. It is preferred to integrate application of my flux into the soldering machine. However, care must be taken to make sure that enough water from the flux has evaporated, to prevent splattering when the hot solder contacts the board.

Most soldering machines do not have the capability of satisfactorily drying the boards after application of a water-based flux. Techniques that can be used to accelerate water evaporation from the flux on the boards include preheating the circuit board before flux application, and/or heating the flux, and/or heating the boards after flux application. The temperature preferred is the lowest temperature that will allow the boards to dry fairly well before being subjected to the soldering preheaters. Otherwise the water can boil on the surface of the circuit board, which results in non-uniform soldering.

It is preferred not to dry the fluxed circuit boards too fast, to avoid boiling and to thereby obtain the most uniform resultant coating of the TAM. This can be accomplished naturally by extending the distance in any given machine between the fluxing station and the soldering station. However, a given soldering machine may not allow or accommodate such extension, and/or the desired conveyor speed in that machine is too fast to allow sufficient drying. In such instance, drying aids, including a drying station, can be used between the fluxing station and the preheaters for soldering. The drying station could include a heat lamp and/or a source of flowing hot air. As indicated above, the drying heat should be low enough, preferably below about 100° C., to avoid bubbling of the flux as it dries.

Turning to step 3 of FIG. 1, the articles to be soldered are passed to a suitable solder application station (denoted by reference numeral 30 in FIG. 2), the solder is applied to the flux coated surfaces in usual manner, e.g., drop dispensing, wave soldering, etc., to form the solder deposit. The solder contacts the surfaces that are to be bonded together, i.e., the bottomside of the circuit board, which concurrently causes boiling off of the non-aqueous flux constituents.

The flux application station 10, drying station 20 and solder application station 30 may be arranged serially, in that respective order, for continuous processing. Alternatively, two or more of the stations may be employed in combination as a single station. In yet another embodiment, batch processing using one or more of the stations is contemplated. For example, a flux coated article may be prepared at a flux application station 10, dried, and thereafter stored for a period of time, prior to soldering. Likewise, it is contemplated that the drying and soldering step may be combined in a single step whereby drying occurs substantially at or near the time of soldering.

Normally, the attaining of a low ionic residue at the site is a function of the soldering temperature used during the operation. Thus, the Three-acid mixture amount in the flux is selected to achieve adequate fluxing action and essentially complete volatilization of the Three-acid mixture under the given soldering conditions so as also to assure the attaining of such low ionic residue.

Simple test runs may be used to optimize the Three-acid mixture amount needed in the flux for the intended purposes at the given soldering temperature while also satisfying the aim of leaving a low ionic residue at the soldering site.

At most, only a trace amount of residue is left on the product. The ionic content of this residue, expressed as micrograms per square centimeter equivalent of NaCl (per Omega Meter® measurement, as later explained), is very low, i.e., below about 5 $\mu g/cm^2$, and especially below about 1.2 $\mu g/cm^2$ for the rosin-free flux.

As used herein, the term a "trace" amount means a very small amount that is less than about 5 $\mu g/cm^2$, i.e., a microgram amount corresponding to less than five millionths of a gram (0.000,001 g) per sq. cm. area (cf. Hackh's Chemical Dictionary, 4th ed. 1969; p. 686: "trace"—a very small quantity, usually less than 5 gamma per gm; p. 288: "gamma"—$10^{-6}$ gm; p. 429: "microgram"—$\mu g$, gamma, one-millionth of a gram).

Thus, use of the invention flux, process, and system affords a reliable quality product of acceptably low ionic residue without cleaning, and even with cleaning, the ionic residue is only slightly further reduced.

In using the soldering flux of the present invention, it is possible to use relatively high concentrations of water as compared with the water concentrations in U.S. Pat. No. 5,004,509 and to minimize violent reactions (with resultant solder ball formation) between water and solder at higher temperatures. The use of water provides numerous advantages, including but not limited to lower cost, relative ease of handling, and environmental advantages, such as compared with other solvents, like alcohols.

The following examples in which all parts and percentages are by weight unless otherwise indicated, are set forth by way of illustration and not limitation of the invention.

EXAMPLE 1

A commercially obtained Three-acid mixture was used. It included 25–30% succinic acid, 42–47% glutaric acid, and 25–30% adipic acid plus 2.3% 2,5-pyrrolidinedione, 2,6-piperidinedione and 0.5% water. This is the Three-acid mixture that I hereinbefore referred to as TAM Formulation #3. It was dissolved in Deionized water. Cyastat®609 wetting agent is also combined with the Three-acid mixture and Deionized water. The amounts of each component are selected to result in a soldering flux having the approximate composition:

| Three-acid mixture | 4% |
| Deionized water | 96% |
| Cyastat ® 609 | 0.0035–0.004% |

EXAMPLES 2–4

Example 1 is repeated except that, respectively, in Examples 2–4, substituted for Cyastat®609 (and in the same amount as Cyastat®609) is Cyastat®SP, Cyastat®SN, and Cyastat®LS.

EXAMPLE 5

TAM Formulation #3 was dissolved in Deionized water. Cyastat®609 wetting agent is also combined with the TAM and Deionized water. The amounts of each component are selected to result in a soldering flux having the approximate composition:

| Three-acid mixture | 2.0% |
|---|---|
| Deionized water | 98.0% |
| Cyastat ® 609 | 0.0035–0.004% |

EXAMPLES 6–8

Example 5 is repeated except that, respectively, in Examples 6–8, substituted for Cyastat®609 (and in the same amount as Cyastat®609) is Cyastat®SP, Cyastat®SN, and Cyastat®LS.

EXAMPLES 9–16

Examples 1–8 were respectively repeated but with the commercially available TAM Formulation #4, instead of TAM Formulation #3. As hereinbefore mentioned, TAM Formulation #4 includes 18–25% succinic acid, 50–55% glutaric acid and 20–25% adipic acid, plus 1.4% succinic anhydride, and particularly 19.5% succinic acid, 51.6% glutaric acid and 22.6% adipic acid, plus 1.4% acid anhydrides (as succinic anhydride), 0.06% nitrogen (Kjeldahl), 0.3% water, 0.4 ppm copper, 0.06 ppm vanadium and 2.4 ppm iron.

Each of the fluxes of Examples 1–16 was individually used to wave solder a 389 $cm^2$ printed circuit board for an automobile air control system. In each case, no cleaning of the circuit boards was necessary after soldering, and the ionic residue ranged from about 0.9–2.6 micrograms per square centimeter of NaCl equivalents using an Omega Meter® for testing.

Further, there is no splattering or solder ball formation during soldering. The soldered boards exhibited excellent soldering characteristics.

It can be appreciated that the specific embodiments described are merely illustrative of the general principles of the invention. Various other modifications may be made consistent with the principles set forth herein, and the spirit and scope of the following claims.

We claim:

1. A low ionic residue soldering flux consisting essentially of:
   (a) up to about 10% by weight of the total flux, an essentially non-subliming dibasic acid mixture containing about 15–30% by weight of the total mixture succinic acid, about 40–63% by weight of the total mixture glutaric acid and about 10–30% by weight of the total mixture adipic acid; and
   (b) a vehicle that is substantially all water.

2. The flux of claim 1 that further includes up to about 0.02% by weight of a wetting agent.

3. The flux of claim 1 wherein the water is Deionized water and the wetting agent is also an antistatic agent.

4. The flux of claim 1 wherein said dibasic acid mixture is present up to about 4% by weight of the total flux.

5. The flux of claim 4 wherein said dibasic acid mixture is present up to about 2.0% by weight of the total flux.

6. The flux of claim 1 wherein said wetting agent is present up to about 0.004 percent by weight of the total flux.

7. The flux of claim 1 wherein the dibasic acid mixture has a boiling point of about 150°–210° C.

8. A process for heat soldering metal surfaces comprising the steps of:
   (a) applying a flux to a surface to be soldered wherein said flux consists essentially of,
      (i) up to about 10% by weight of the total flux, an essentially non-subliming dibasic acid mixture containing about 15–30% by weight of the total mixture succinic acid, about 40–63% by weight of the total mixture glutaric acid and about 10–30% by weight of the total mixture adipic acid;
      (ii) up to about 0.02% by weight of the total flux of a wetting agent; and
      (iii) the balance water;
   (b) drying said flux; and
   (c) applying solder to said surface.

9. The process of claim 8 wherein said drying step (b) includes heating said flux to remove water from said flux.

10. The process of claim 8 wherein the flux contains up to only about 4% by weight of the dibasic acid mixture, and said drying step (b) includes heating said surface to a temperature above room temperature but less than about 100° C., before exposing said surface to soldering temperatures of step (c).

11. A system for heat soldering metal surfaces, comprising:
   (a) a station at which a flux is applied to a surface where soldering is to occur, which flux consists essentially of:
      (i) up to about 10% by weight of the total flux, an essentially non-subliming dibasic acid mixture containing about 15–30% by weight of the total mixture succinic acid, about 40–63% by weight of the total mixture glutaric acid and about 10–30% by weight of the total mixture adipic acid;
      (ii) up to about 0.02% by weight of the total flux of a wetting agent; and
      (iii) a water vehicle;
   (b) a station for drying said flux; and
   (c) a station for soldering said metal surface.

12. The system as recited in claim 11 wherein the flux contains only up to about 4% by weight of the dibasic acid mixture, up to 0.004% by weight of the wetting agent, the wetting agent is also an antistatic agent, the flux application station includes means for heating the flux to a temperature less than 100° C. and means for applying the flux by spraying, and the flux drying station includes means for heating the surface to a temperature similar to the temperature of the flux in the flux application station.

* * * * *